(12) United States Patent
Arcudia

(10) Patent No.: US 10,992,230 B1
(45) Date of Patent: Apr. 27, 2021

(54) MULTI-PHASE SWITCHING MODE POWER SUPPLY WITH ADAPTIVE SYNCHRONOUS DRIVERS

(71) Applicant: Wavious, LLC, San Diego, CA (US)

(72) Inventor: Kenneth Arcudia, Cary, NC (US)

(73) Assignee: WAVIOUS, LLC, San Diego, CA (US)

( * ) Notice: Subject to any disclaimer, the term of this patent is extended or adjusted under 35 U.S.C. 154(b) by 45 days.

(21) Appl. No.: 16/694,059

(22) Filed: Nov. 25, 2019

Related U.S. Application Data

(60) Provisional application No. 62/925,414, filed on Oct. 24, 2019.

(51) Int. Cl.
*H02M 3/158* (2006.01)
*H02M 3/335* (2006.01)
*H02M 1/08* (2006.01)

(52) U.S. Cl.
CPC ............. *H02M 3/158* (2013.01); *H02M 1/08* (2013.01); *H02M 3/33592* (2013.01); *H02M 2003/1586* (2013.01)

(58) Field of Classification Search
CPC ......... H02M 3/158; H02M 2003/1586; H02M 1/08; H02M 2001/0032
See application file for complete search history.

(56) References Cited

U.S. PATENT DOCUMENTS

| | | | |
|---|---|---|---|
| 6,246,222 B1 * | 6/2001 | Nilles | H02M 3/1584 323/283 |
| 7,262,977 B2 | 8/2007 | Kyono | |
| 2002/0001205 A1 | 1/2002 | Lentini et al. | |
| 2003/0214274 A1 | 11/2003 | Letheiiier | |
| 2003/0218893 A1 * | 11/2003 | Tai | H02M 3/1584 363/65 |
| 2005/0024908 A1 | 2/2005 | Gizara | |
| 2006/0171180 A1 | 8/2006 | Kyono | |
| 2009/0316441 A1 | 12/2009 | Hu | |
| 2011/0025284 A1 * | 2/2011 | Xu | H02M 3/1588 323/282 |
| 2011/0169471 A1 * | 7/2011 | Nagasawa | H01L 24/40 323/283 |
| 2015/0280573 A1 | 10/2015 | Gong et al. | |
| 2015/0326120 A1 * | 11/2015 | Kelin | H02M 3/158 323/282 |

* cited by examiner

*Primary Examiner* — Thienvu V Tran
*Assistant Examiner* — Sisay G Tiku
(74) *Attorney, Agent, or Firm* — Law Office of Gerald Maliszewski; Gerald Maliszewski

(57) ABSTRACT

A multi-phase switching mode power supply (SMPS) with adaptive synchronous drivers is provided. A pulse width modulator creates n periodic interleaved modulation pulses having a pulse width responsive to a load voltage. Modulation pulses are converted into selectively enabled driver pulses having a duty cycle responsive to the modulation pulse. The polarity of the voltage is detected at a completion of each driver pulse duty cycle. A comparator signal is supplied in response to comparing detected voltages to a reference voltage, and in turn, driver gating signals are supplied to selectively enable driver pulses in response to analyzing comparator signals. The comparator signals are summed and integrated. Driver pulses are enabled or disabled in response to the integrated sum. Energy is stored from each driver pulse into a corresponding inductor, and supplied as current to a load, creating the load voltage.

20 Claims, 9 Drawing Sheets

MULTI-PHASE SWITCHING MODE POWER SUPPLY WITH ADAPTIVE SYNCHRONOUS DRIVERS

BACKGROUND OF THE INVENTION

1. Field of the Invention

This invention generally relates to power supplies and, more particularly, to a multi-phase switched mode power supply capable of disabling driver phases when they are not required to supply a load voltage.

2. Description of the Related Art

As noted in US 2003/0214274, invented by Patrice Lethellier, published Nov. 20, 2003, switched mode DC-to-DC power converters are commonly used in the electronics industry to convert an available direct current (DC) level voltage to another DC level voltage. A switched mode converter provides a regulated DC output voltage to a load by selectively storing energy in an output inductor coupled to the load by switching the flow of current into the output inductor. A synchronous buck converter is a particular type of switched mode converter that uses power switches, typically MOSFET transistors, to control the flow of current in the output inductor. A high-side of the switch selectively couples the inductor to a first power supply voltage while a low-side of the switch selectively couples the inductor to a second power supply voltage, such as ground. In one variation the low-side of the switch is a diode. A pulse width modulation (PWM) control circuit is used to control the gating of the high-side and low-side switches in an alternating manner. Synchronous buck converters generally offer high efficiency and high power density, particularly when MOSFET devices are used due to their relatively low on-resistance. Therefore, synchronous buck converters are advantageous for use in providing power to electronic systems, such as microprocessors that require a control voltage (Vcc) of 1 to 1.5 volts with current ranging from 40 to 60 amps.

For certain applications having especially demanding current load requirements, it is known to combine plural synchronous buck converters together in multi-phase configurations operated in an interleaved mode, referred to as a multi-phase switched mode power supply (SMPS). The output inductors of each of the multiple channels are connected together to provide a single output voltage. The PWM control circuit provides a variable duty cycle control signal to each channel in order to control its switching. The multiple channels are operated in a synchronous manner, with the respective to the high-sides of the switches of each channel being switched on at different phases of a power cycle. Multi-phase configurations are advantageous in that they provide an increase in the frequency of the ripple across the output voltage above the switching frequency of the individual channels, thereby enabling the use of smaller output capacitors to reduce the ripple. Also, by spreading the output current among the multiple channels, the stress on individual components of the power converter is reduced.

To regulate the performance of a multi-phase power converter, it is known to enforce current sharing between the channels so that each channel is carrying an appropriate proportion of the output current. Current sharing systems monitor the current of each channel and adjust the duty cycle to the channels to ensure an even distribution of current. One approach to monitoring the current of each channel is to include a sensing resistor in series with each respective output inductor and to monitor the voltage drop across the sensing resistor. A significant drawback of this approach is that the sensing resistors waste the output energy and thereby reduce the efficiency of the multi-phase power converter. Moreover, the sensing resistors generate heat that must be removed from the system.

Alternatively, the sensing resistors can be disposed in series with the respective high-sides of the switches, which results in less energy dissipation than the preceding approach. But, a drawback of this approach is that the high-side of the switches change state at a relatively high rate (e.g., greater than 250 KHz) and, as a result, the high-side switch current is discontinuous. The information obtained from sampling the voltage across the sensing resistors must therefore be utilized during a subsequent switching cycle, making it necessary to include "sample and hold" circuitry to store the sampled information from cycle to cycle. Not only does this add complexity to the converter, but there is also a time delay in regulating the output current that diminishes the stability of the converter.

Yet another approach to measuring the channel current is to include a filter in parallel with each output inductor. The filter includes a resistor and a capacitor connected together in series. The signal passing through the output inductor has a DC component and an AC component. The AC component of the signal depends on the inductance and internal resistance values of the output inductor, as well as the resistance and capacitance of the current sensor. Through proper selection of the values of the resistor and capacitor, the instantaneous voltage across the capacitor can be made equal to the voltage across the DC resistance of the inductor and thereby proportional to the instantaneous current through the output inductor. Thus, the output inductor current can be sensed without dissipating the output energy by monitoring the voltage across the capacitor. A drawback of this approach is that the current sense signal has relatively small amplitude that is close to the noise floor and therefore highly susceptible to distortion due to high frequency noise. While the high frequency noise can be removed using low pass filters, it substantially increases the component count and complexity of the power converter to include separate low pass filters for each of the channels.

FIG. 1 depicts voltage and current graphs associated with a multi-phase SMPS buck converter (prior art). Many SMPS designs incorporate dual modes, where the "normal" mode incorporates pulse width modulation. As noted above, in synchronous rectification, where catch (low-side) diodes are eliminated to improve efficiency, the pulses can be driven by an NMOS pull-down transistor and a PMOS pull-up transistor. The inductor current waveform is triangular, as this is the result of inductor behavior which integrates the input voltage to get the output current, which is fundamental to the operation of this type of switched-mode power supply. The equation for the inductor current is given in equation 1:

$$I_L = 1/L \sim_0^T V dt \qquad (1)$$

Assuming a squarewave input with an amplitude of 1.8 volts, a pulse width of 5 ns, an inductor value of 15 nanoHenry (nH), and an output voltage of 0.9 volts, the peak-to-peak amplitude of the inductor current becomes:

$$I_L = (1/15 \text{ nH})(1.8-0.9)(5 \text{ ns}) = 300 \text{ mA} \qquad (2)$$

The midpoint of the waveform depends on the current being pulled by the load. In this example, the load current is equal to 0.05 amps.

When the current being pulled by the load becomes small, the current waveform can dip below zero, which means that current is being sent to ground from the energy stored in the load capacitance and this becomes wasted power. Many SMPS designs incorporate a second mode to address the efficiency losses under those conditions such as the Pulse-Frequency modulation scheme, where the pulse frequency is reduced by extending the off time while keeping the on-time constant. Other designs utilize a pulse-skipping mode where bursts of pulses are sent with off-time in between the bursts.

It would be advantageous if a multi-phase SMPS with synchronous rectification could be operated with greater efficiency without modifying the basic PWM mechanisms.

SUMMARY OF THE INVENTION

Disclosed herein is a multi-phase switched mode power supply (SMPS) with synchronous rectification, that incorporates a pulse skipping function, independent of pulse width modulation, where entire pulses (high and low sides) are skipped as needed, by setting the pulse driver outputs in tri-state. Tri-stating causes the inductor current waveforms to remain above zero with no burst intervals. A multi-phase SMPS uses multiple phases to provide current to a load with the output pulses spaced apart to minimize noise ripple. In a similar way, the individual outputs from a multi-phase SMPS can be tri-stated or turned off to raise the current waveforms above zero. This is accomplished by raising the midpoint of the inductor current. A loop controller prevents the output voltage from falling below a target value.

Accordingly, a multi-phase SMPS method for with adaptively controlling synchronous drivers is provided. The method creates n periodic interleaved modulation pulses having a pulse width responsive to a load voltage, where n is a positive integer greater than 1. Modulation pulses are converted into selectively enabled driver pulses having a duty cycle responsive to the modulation pulse. The polarity of the voltage is detected at a completion of each driver pulse duty cycle. The driver pulse duty cycle includes a high voltage portion and a low voltage portion, as is conventional, and the completion of the driver pulse duty cycle is associated with the low voltage portion. A comparator signal is supplied in response to comparing detected voltages to a first reference voltage, and in turn, driver gating signals are supplied to selectively enable driver pulses in response to analyzing comparator signals. Energy is stored from each driver pulse into a corresponding inductor, and supplied as current to a load, creating the load voltage.

In one aspect, the step of supplying a comparator signal in response to comparing the detected voltage to the first reference voltage includes substeps. A first comparator signal is supplied in response to the detected driver pulse voltage polarity being greater than the first reference voltage. A second comparator signal is supplied in response to the detected driver voltage polarity being less than the first reference voltage. Then, analyzing the comparator signals includes the following substeps. A first value is added to a sum in response to receiving any first comparator signal. The first value is subtracted from the sum in response to receiving only second comparator signals in a PWM period. The sum is integrated, and driver gating signals enabling, or disabling driver pulses are supplied in response to the integrated sum.

Typically, the step of detecting the polarity of the voltage at the completion of each driver pulse duty cycle includes detecting a voltage polarity for each of the n driver pulses. Thus, the step of supplying the comparator signal in response to comparing the detected voltage to the first reference voltage includes supplying a comparator signal for each of the n driver pulses.

In one example, analyzing the comparator signals includes the following substeps. The n comparator signals are OR'd (compared using an OR logic function) to supply an OR'd result, which is integrating to supply the integrated sum. The integrated sum is sigma-delta modulated to supply the driver pulse gating signals. In one aspect, driver gating signals are supplied to disable driver pulses by synchronizing a modulation pulse with a corresponding driver pulse gating (disable) signal.

Typically, the modulation pulses are converted into selectively enabled driver pulses using a plurality of parallel NMOS transistor and a PMOS transistor switches, with each switch is connected between a supply voltage and the first reference voltage. The gates of these switches accept the modulation pulses, and connected source/drains supply driver pulses. In one aspect, the nth modulation pulse is converted into m parallel driver pulse segments having a summed output, where each driver pulse segment is selectively enabled in response to a corresponding segmentation signal. In this aspect, the step of analyzing the comparator signals further includes supplying segmentation signals in response to analyzing the integrated sum.

The step of creating n periodic interleaved modulation pulses having a pulse width responsive to the load voltage includes the following substeps. A ramp reference voltage is created in response to comparing the load voltage to a primary voltage reference. n periodic interleaved ramped voltage signals are generated, and the ramp reference voltage is compared to each ramped voltage signal to supply n modulation pulses to a corresponding driver.

The advantage of the above-described method is that SMPS power consumption is minimized in response to disabling driver pulses when the integrated sum remaining a constant value (e.g., the load is receiving sufficient current). As a more explicit example, at a first time the step of supplying the comparator signal includes supplying second comparator signals in response to detected voltages being less than the first reference voltage. As a result, n number of driver pulses are enabled and the inductors supplying a first current to the load with a first efficiency. At a second time, first comparator signals are supplied in response to detected voltages being greater than the first reference voltage. The result is that (n−1) number of driver pulses are enabled and the inductors supplying a second current to the load, while maintaining the first efficiency.

Additional details of the above-described method, as well as a multi-phase SMPS with adaptive synchronous drivers, are presented below.

DETAILED DESCRIPTION

Figure 2:
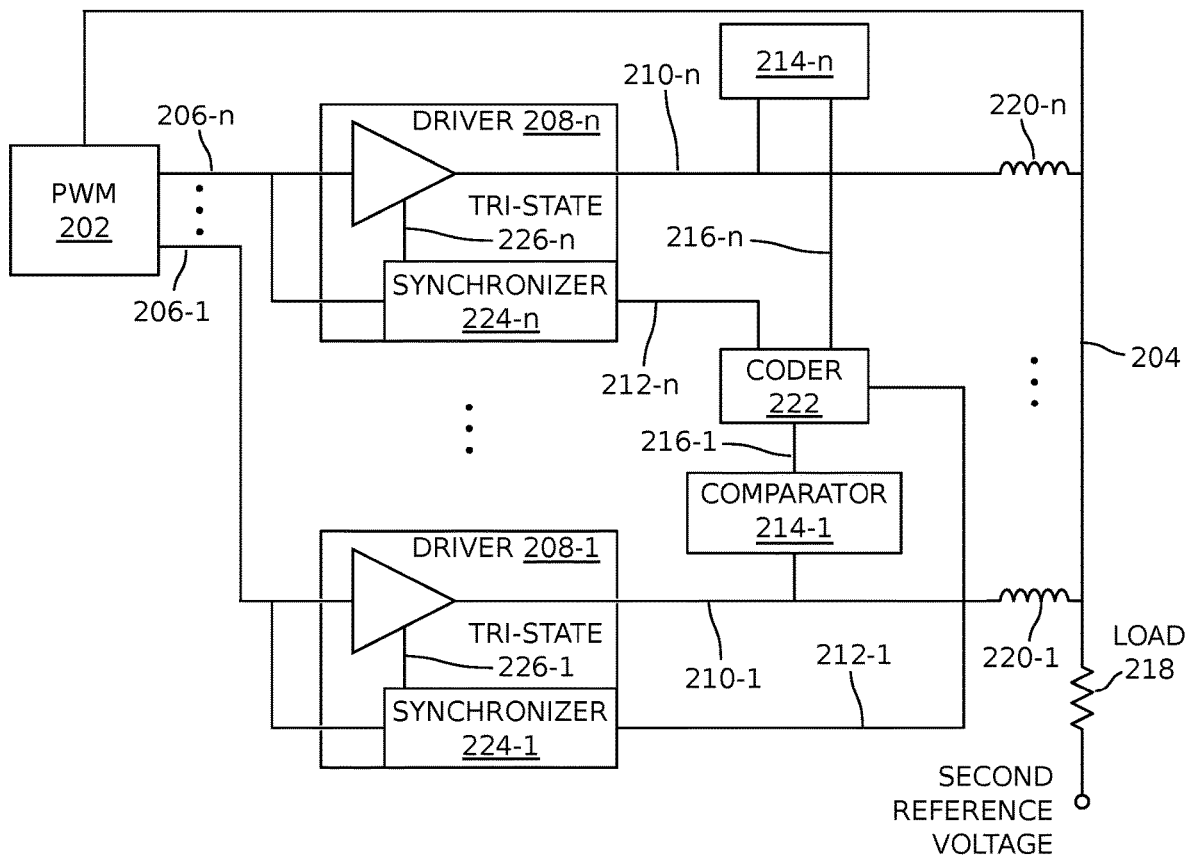
FIG. 2 is a schematic block diagram of a multi-phase switching mode power supply (SMPS) with adaptive synchronous drivers.

FIG. 2 is a schematic block diagram of a multi-phase switching mode power supply (SMPS) with adaptive synchronous drivers. The multi-phase SMPS 200 comprises a pulse width modulator (PWM) 202 having a feedback input on line 204 to accept a load voltage and an output on lines 206-1 through 206-$n$ to supply n periodic interleaved modulation pulses having a pulse width responsive to the load voltage. n is a positive integer greater than 1. The SMPS 200 comprises n synchronous drivers 208-1 through 208-$n$. Drivers 208-1 through 208-$n$ have respective inputs on lines 206-1 through 206-$n$ to accept corresponding modulation pulses. Drivers 208-1 through 208-$n$ have respective outputs on lines 210-1 through 210-$n$ to supply driver pulses having a duty cycle responsive to the modulation pulses, The drivers 208-1 through 208-$n$ have respective inputs on lines 212-1 through 212-$n$ to accept a driver gating signals capable of enabling and disabling the drivers.

Figure 1:
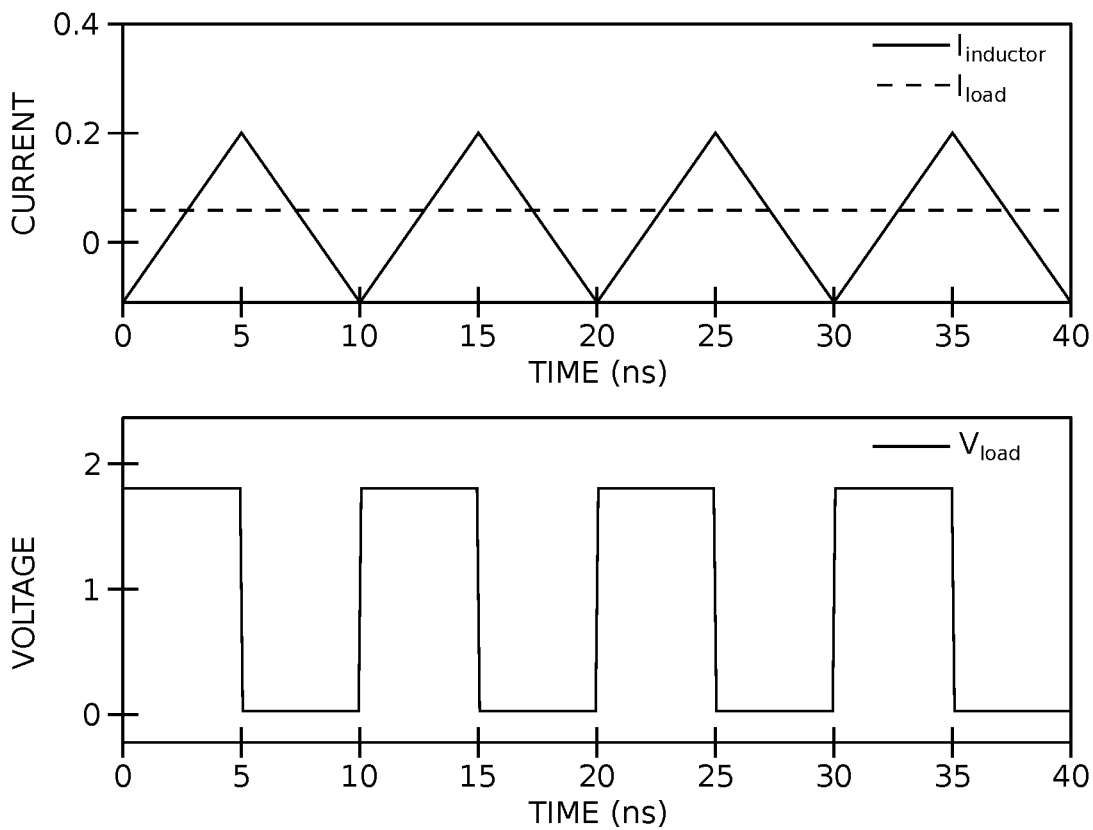
FIG. 1 depicts voltage and current graphs associated with a multi-phase SMPS buck converter (prior art).

SMPS 200 further comprises n comparators 214-1 through 214-$n$. Comparators 214-1 through 214-$n$ have respective inputs on lines 210-1 through 210-$n$ for detecting a polarity of a voltage at a completion of the driver pulse duty cycle, where the driver pulse duty cycle comprises a high voltage portion and a low voltage portion (see the voltage waveform of FIG. 1), and the completion of the driver pulse duty cycle is associated with the low voltage portion. The comparators 214-1 through 214-$n$ supply comparator signals as outputs responsive to the comparison of the detected voltage with the first reference voltage, respectively on lines 216-1 through 216-$n$.

The SMPS 200 comprises a load 218, represented as a resistor, having a first terminal on line 204 to supply the load voltage and a second terminal connected to a second reference voltage. Typically, the first and second reference voltages are ground, but alternatively, one or both may be a negative voltage. The SMPS 200 comprises n inductors 220-1 through 220-$n$, connected in series between corresponding driver outputs on lines 210-1 through 210-$n$ and the load first terminal on line 204. A coder 222 has an input to accept the n comparator signals on lines 216-1 through 216-$n$ and an output to supply driver gating signals on lines 212-1 through 212-$n$ in response to analyzing the comparator signals.

Each comparator 214-$x$, where x arbitrarily represents any integer 1 through n, supplies a first comparator signal in response to the detected driver pulse voltage polarity being greater than the first reference voltage and a second comparator signal in response to the detected driver voltage polarity being less than the first reference voltage. The coder 222 adds a first value to a sum in response to any comparator supplying the first comparator signal, and subtracts the first value from the sum in response to all the comparators supplying the second comparator signal in a PWM period. The coder 222 integrates the sum and supplies driver gating signals enabling or disabling drivers in response to the integrated sum. In other words, the coder works to disable drivers when a negative voltage, as compared to the first reference voltage, is detected at all the driver outputs, indicating that the load is receiving sufficient current. The coder 222 begins to enable drivers when at least one of the detected driver output voltages fails to drop below the first reference voltage, indicating an increased need for current by the load.

In one aspect, drivers 210-1 through 210-$n$ each further comprise respective synchronizer 224-1 through 224-$n$, having inputs to accept a corresponding modulation signal on lines 206-1 through 206-$n$, inputs to accept a corresponding driver gating signal 212-1 through 212-$n$ disabling the driver, outputs to supply a corresponding driver switch tri-state signals on lines 226-1 through 226-$n$, and masking signal outputs on lines 228-1 through 228-$n$ connected to corresponding comparators 214-1 through 214-$n$, for selecting the second comparator signal. That is, the synchronizers insure that the drivers are disabled concurrently with their corresponding input modulation pulses, and also insure that corresponding comparators report a detected voltage below the first reference voltage to the coder, despite the fact that the tri-state voltage output by a disabled driver is above the first reference voltage.

In one aspect, the PWM 202 and drivers 208-1 through 208-$n$ may be seen as components in a voltage control loop, while the comparators 214-1 through 214-$n$, synchronizers 224-1 through 224-$n$, and coder 222 may be seen as components in a current control loop. Alternatively, the selectively enabled drivers may be understood to be component shared by both loops.

Figure 3:
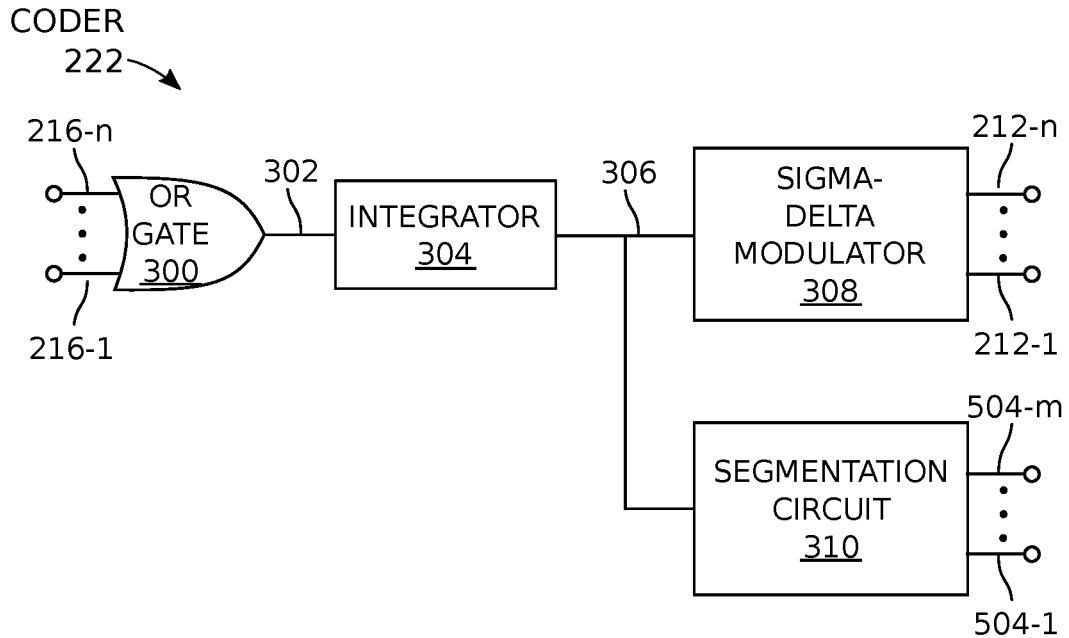
FIG. 3 is a schematic block diagram depicting an exemplary coder.

FIG. 3 is a schematic block diagram depicting an exemplary coder. In this aspect, the coder 222 comprises an OR gate 300 having inputs in line 216-1 through 216-$n$ to accept the n comparator signals and an output to supply an OR'd result on line 302. An integrator 304 has an input on line 302 to accept values responsive to the OR's result and an output on line 306 to supply the integrated sum. In this aspect, the integrator is assumed to incorporate logic sufficient to convert a received 0 bit to a −1 value to support the above-presented logic. A sigma-delta modulator 308 has an input on line 306 to accept the integrated sum and an output to supply the driver gating signals on lines 212-1 through 212-$n$. There exists many other means of implementing these logical functions, extending through the use of combinational logic to processor-executable software algorithms, and the SMPS is not limited to any particular type of logic.

Figure 4:
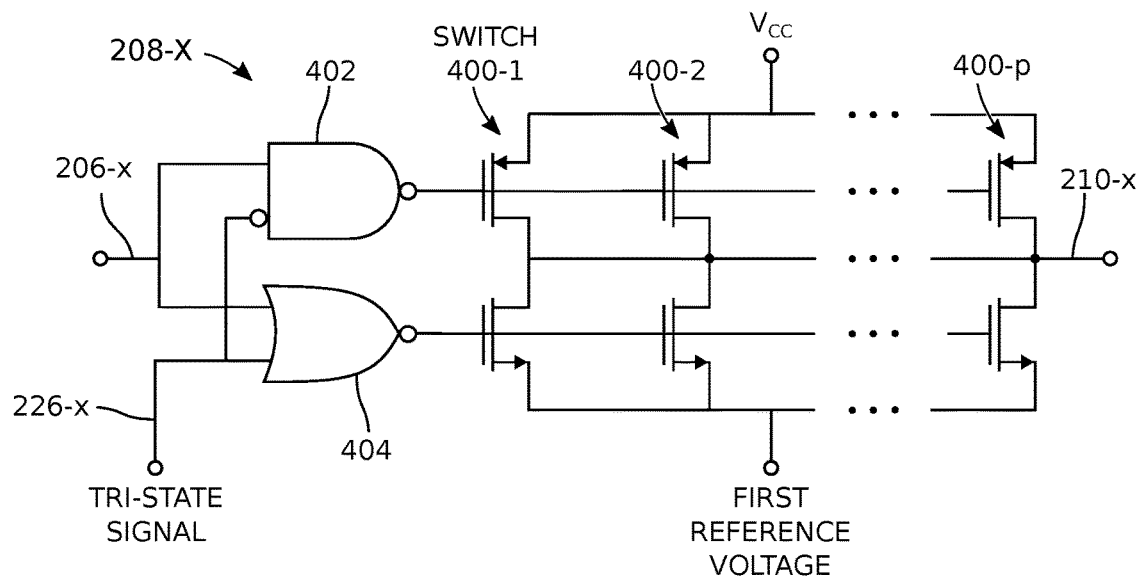
FIG. 4 is a schematic diagram depicting an exemplary driver.

FIG. 4 is a schematic diagram depicting an exemplary driver. Typically, each driver 208-$x$ comprises a plurality of parallel NMOS transistor and a PMOS transistor switches 400-1 through 400-$p$, where p is an integer greater than 1. Each switch 400-$x$ is connected between a supply voltage (e.g., Vcc) and the first reference voltage, where the supply voltage has a higher potential than the first reference voltage. An exemplary tri-state mechanism is enabled in response to the tri-state signal 226-$x$, NAND gate 402, and NOR gate 404.

Figure 5:
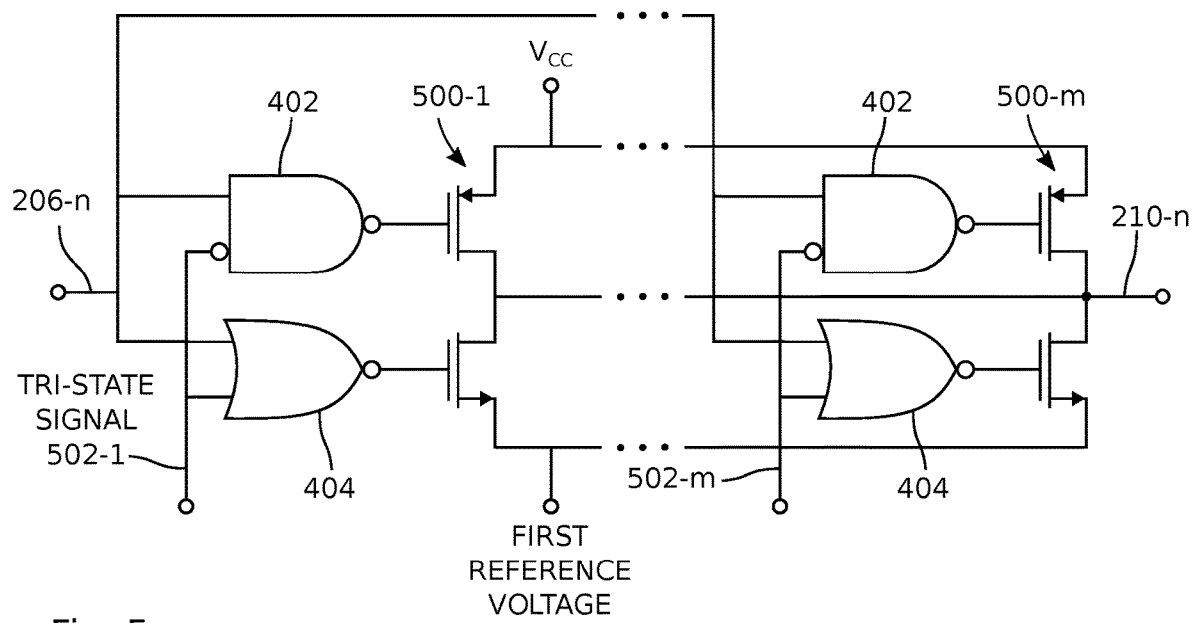
FIG. 5 is a schematic diagram depicting an exemplary driver with segmented switches.

FIG. 5 is a schematic diagram depicting an exemplary driver with segmented switches. In this optional example, the nth driver 208-*n* may comprise m parallel segmented switches 500-1 through 500-*m* having a summed output on line 210-*n*. Segmented switches 500-1 through 500-*m* have inputs to accept the corresponding nth driver modulation pulse 206-*n* and inputs to accept a tri-state signal respectively on lines 502-1 through 502-*m*, supplied by synchronizer 224-*n* (not shown), and acting in cooperation with NAND gates 402 and NOR gates 404. Typically, the segmentation switches of the nth driver are the last switches to be cycled on and off, after the other drivers have been disabled. Returning briefly to FIG. 3, the coder 222 further comprises a segmentation circuit 310 having an input to accept the integrated sum on line 306, and an output to supply the segmentation signals 504-1 through 504-*m* to synchronizer 224-*n* (not shown), for the segmented switches in the nth driver. As with the other driver circuits, the synchronizer coordinates the delivery of the tri-state and masking signal outputs with the input modulation pulse. Each of the segmented switches 500-1 through 500-*m* is enabled in response to a corresponding segmentation signal on lines 504-1 through 504-*m*, which act in place of the driver gating signals used for drivers 208-1 through 208-(*n*-1). The segmentation allows for power savings in the SMPS and has a large impact on efficiency since when segmentation is active, it implies that the power consumed by the load is relatively small and therefore any reduction in power dissipation has a proportionally large effect on efficiency. Although depicted as a distinct logic element, the segmentation circuit could be implemented using the sigma-delta modulator.

Figure 6:
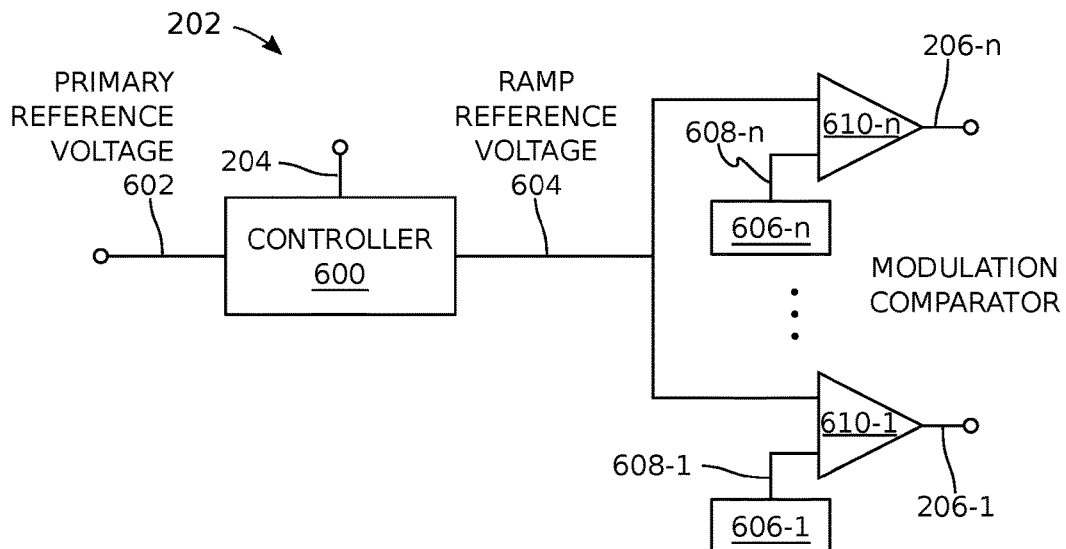
FIG. 6 is a schematic block diagram depicting an exemplary PWM.

FIG. 6 is a schematic block diagram depicting an exemplary PWM. The PWM 202 comprises a controller 600 having an input to accept the load voltage on line 204, an input to accept a primary reference voltage on line 602, and an output on line 604 to supply a ramp reference voltage in response to a comparison of the load and primary reference voltages. The PWM 202 of this example further comprises n ramp generators 606-1 through 606-*n*, respectively supplying periodic interleaved ramped voltage signal on lines 608-1 through 608-*n*. The PWM 202 also comprises n modulation comparators 610-1 through 610-*n*. The modulation comparators 610-1 through 610-*n* have inputs to accept the ramp reference voltage on line 604, inputs to accept a corresponding ramped voltage signals on lines 608-1 through 608-*n*, and outputs to supply modulation pulses to a corresponding drivers on lines 206-1 through 206-*n*.

Figure 7:
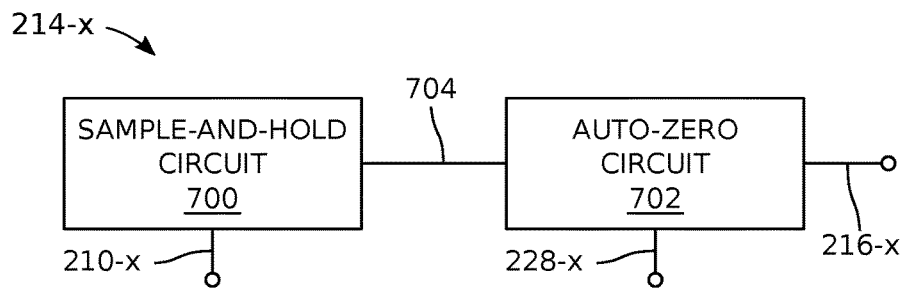
FIG. 7 is a schematic block diagram depicting an exemplary comparator.

FIG. 7 is a schematic block diagram depicting an exemplary comparator. Each comparator 214-*x* comprises a sample-and-hold circuit 700 having an input on line 210-*x* to capture the voltage polarity at the completion of the pulse driver duty cycle. Again, "x" represents arbitrarily any value 1 through n. Comparator 214-*x* further comprises an auto-zero circuit 702 having an input on line 704 to accept the sample-and-hold output, and an output to supply the comparator signal on line 216-*x*.

Figure 8A:
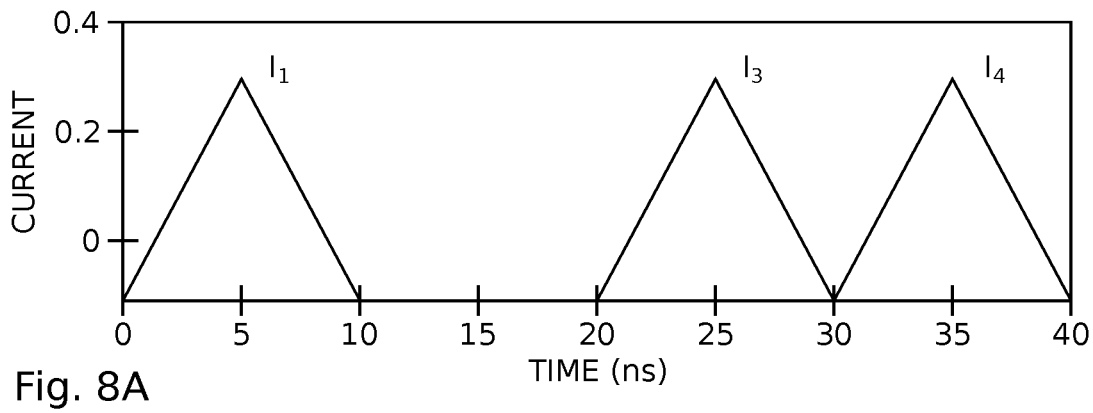
FIGS. 8A through 8C are graphs respectively depicting inductor currents, driver pulse voltages, and a tri-state voltages for a single-phase SMPS in a condition where one of the driver phases is disabled in response to a tri-state signal.
Figure 8B:
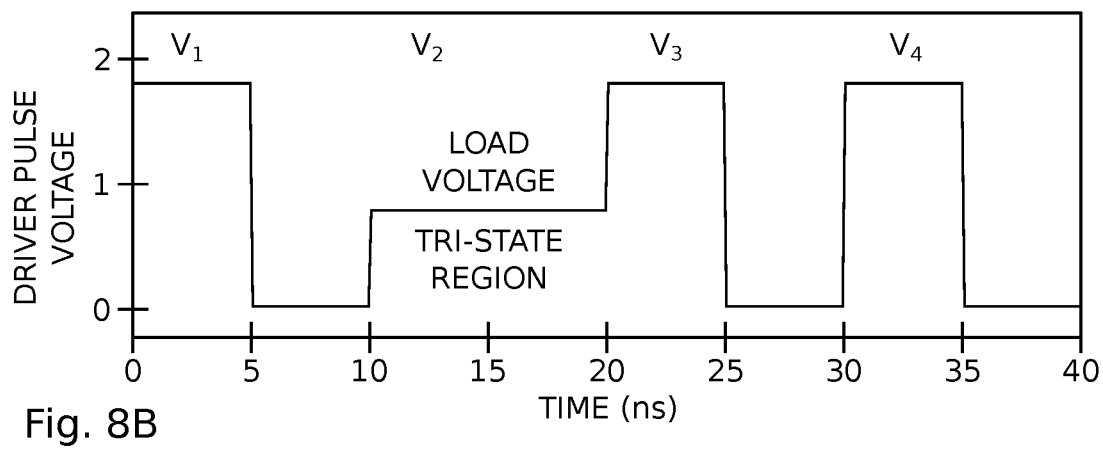
Figure 8C:
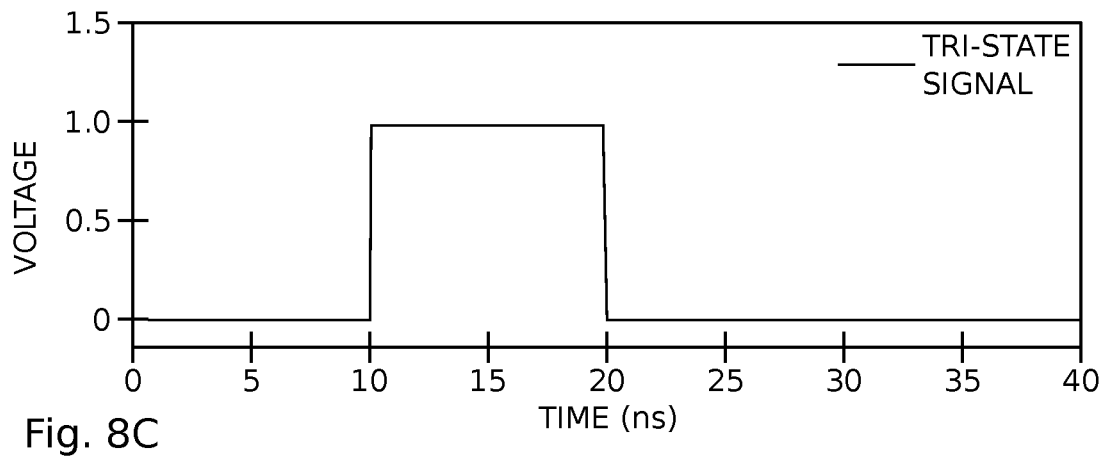

FIGS. 8A through 8C are graphs respectively depicting inductor currents, driver pulse voltages, and a tri-state voltages for a single-phase SMPS in a condition where one of the driver phases is disabled in response to a tri-state signal.

Figure 9A:
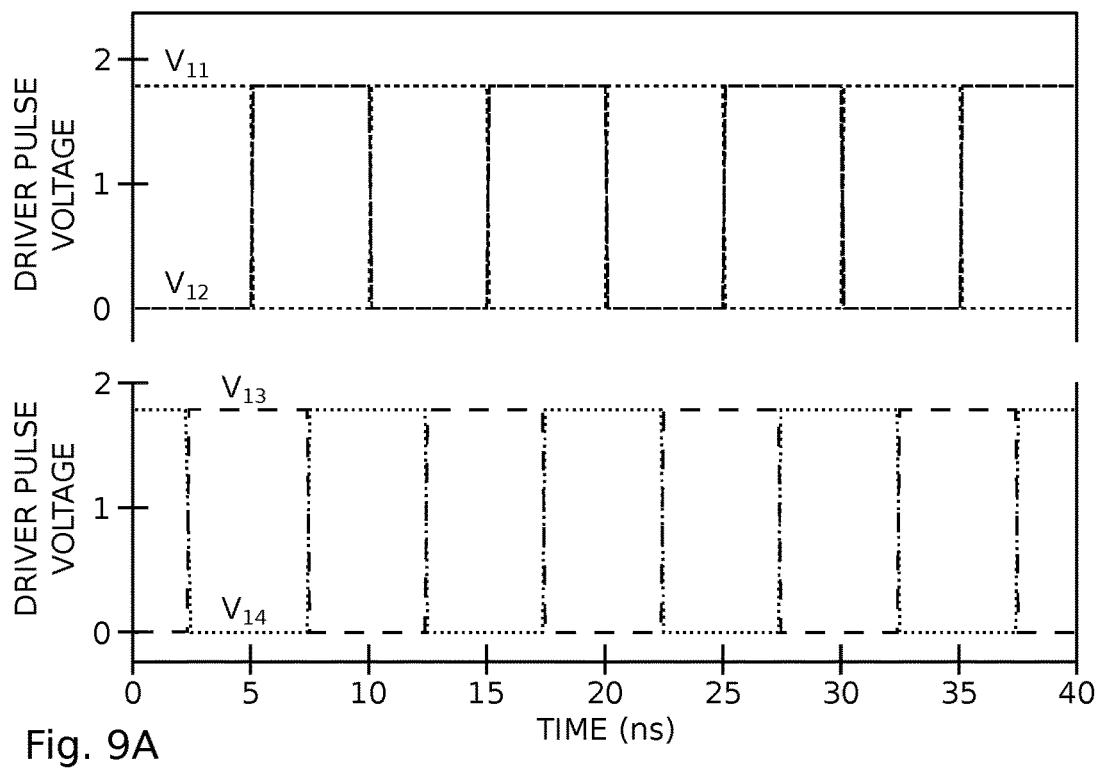
FIGS. 9A through 9C are graphs respectively depicting driver pulse voltages, inductor currents, tri-state voltages, and comparator output voltages for a 4-phase SMPS in a first state.
Figure 9B:
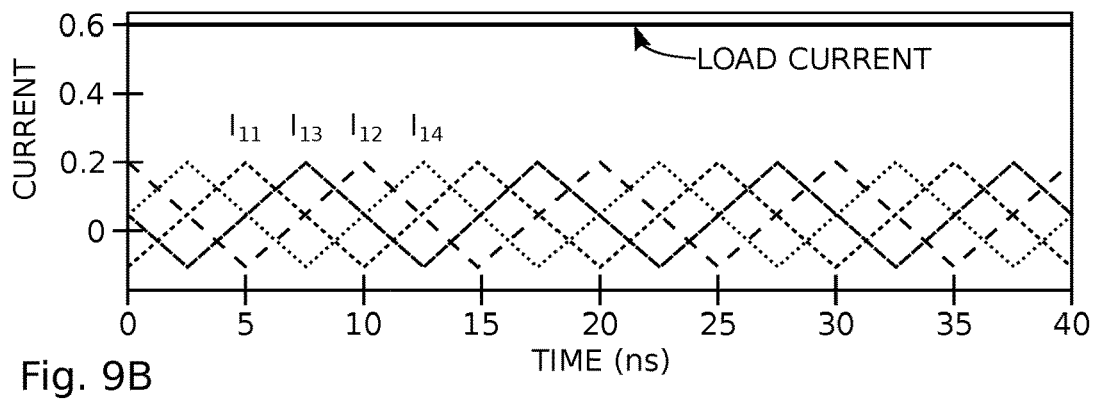
Figure 9C:
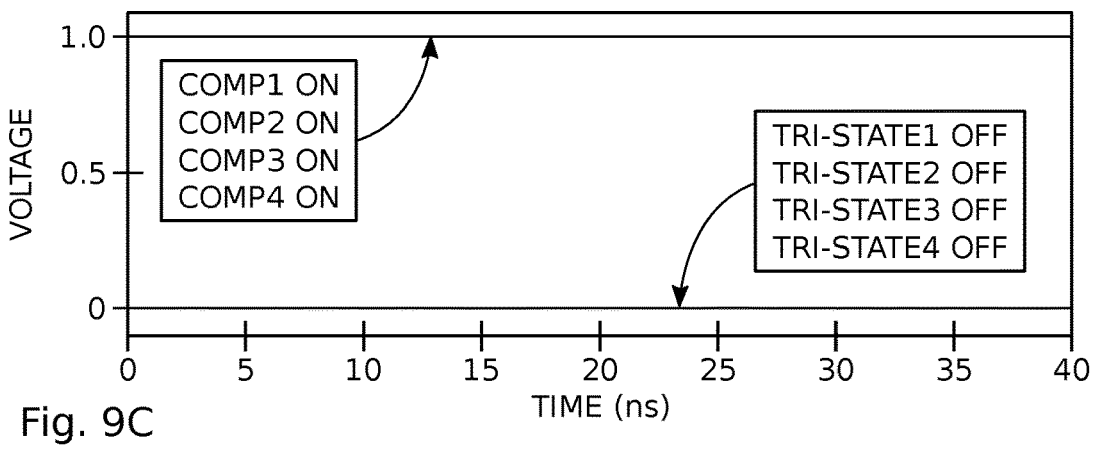

FIGS. 9A through 9C are graphs respectively depicting driver pulse voltages, inductor currents, tri-state voltages, and comparator output voltages for a 4-phase SMPS in a first state. The comparators are all outputting a first comparator signal (i.e., 1 volt) in response to detecting end-of-duty cycle voltages greater than the first reference voltage, which in this case is ground. The result is that all the drivers are enabled.

Figure 10A:
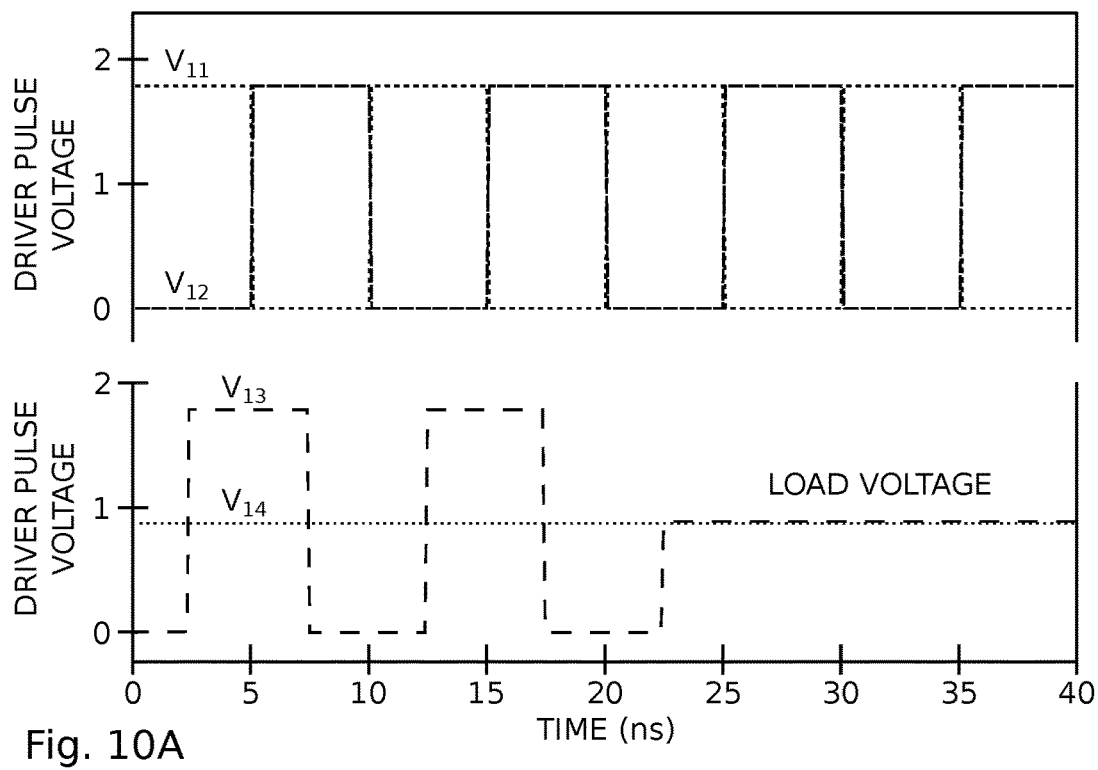
FIGS. 10A through 10C are graphs respectively depicting driver pulse voltages, inductor currents, and tri-state voltages for the 4-phase SMPS in a second state.
Figure 10B:
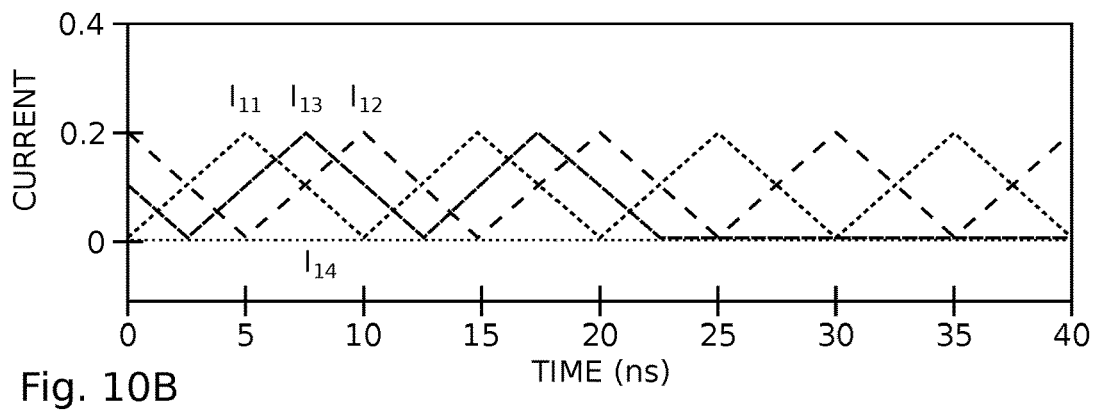
Figure 10C:
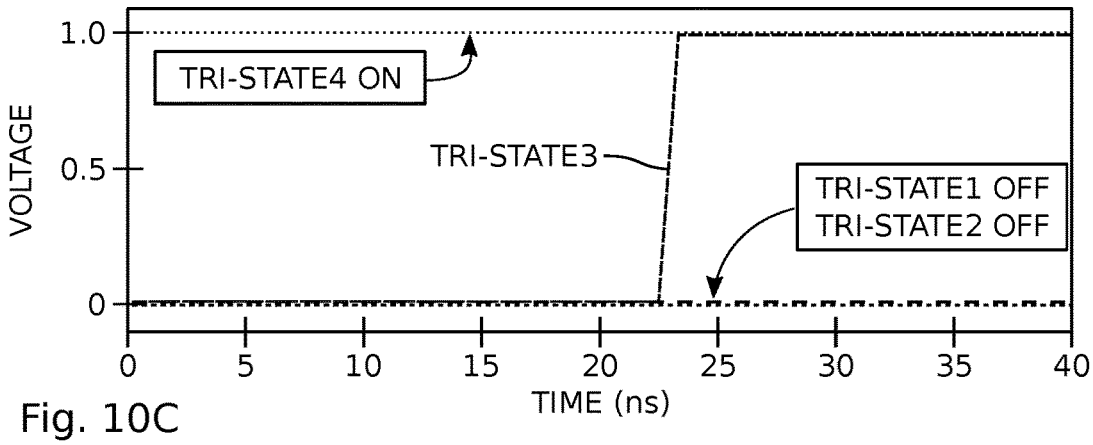

FIGS. 10A through 10C are graphs respectively depicting driver pulse voltages, inductor currents, and tri-state voltages for the 4-phase SMPS in a second state. The comparators are all outputting a second comparator signal (i.e., ground=first reference voltage) in response to detecting end-of-duty cycle voltages less than the first reference voltage. Initially, the fourth driver is disabled. Although not explicitly shown, the comparators are all outputting the second comparator signal value of zero. When it becomes evident to the coder that the comparator signals are not changing, the coder disables the third driver at approximately the 22.5 nanoseconds (ns) mark. It should be remembered that because the coder is integrating the comparator signals, the driver gating (and tri-state) signals do not instantaneously change in response to the comparator signals.

For example, a 1-bit sigma-delta modulator can be used to express many values—not just a 1 or zero. That is, the n "wires" out of the sigma delta modulators can express hundreds of distinct values embedded in the way it the output is modulated. The modulation is set such that the currents remain just above zero. The "value" at the output of the sigma delta is determined by its input (the output of the integrator). The output of the integrator looks like a ramp going up or down while it is settling, and a set value when it is settled. To continue, a 1-bit modulator output can be used to express the value of 0.33 using a repeatable pattern of a high followed by 2 lows because 1/3=0.33

Figure 11A:
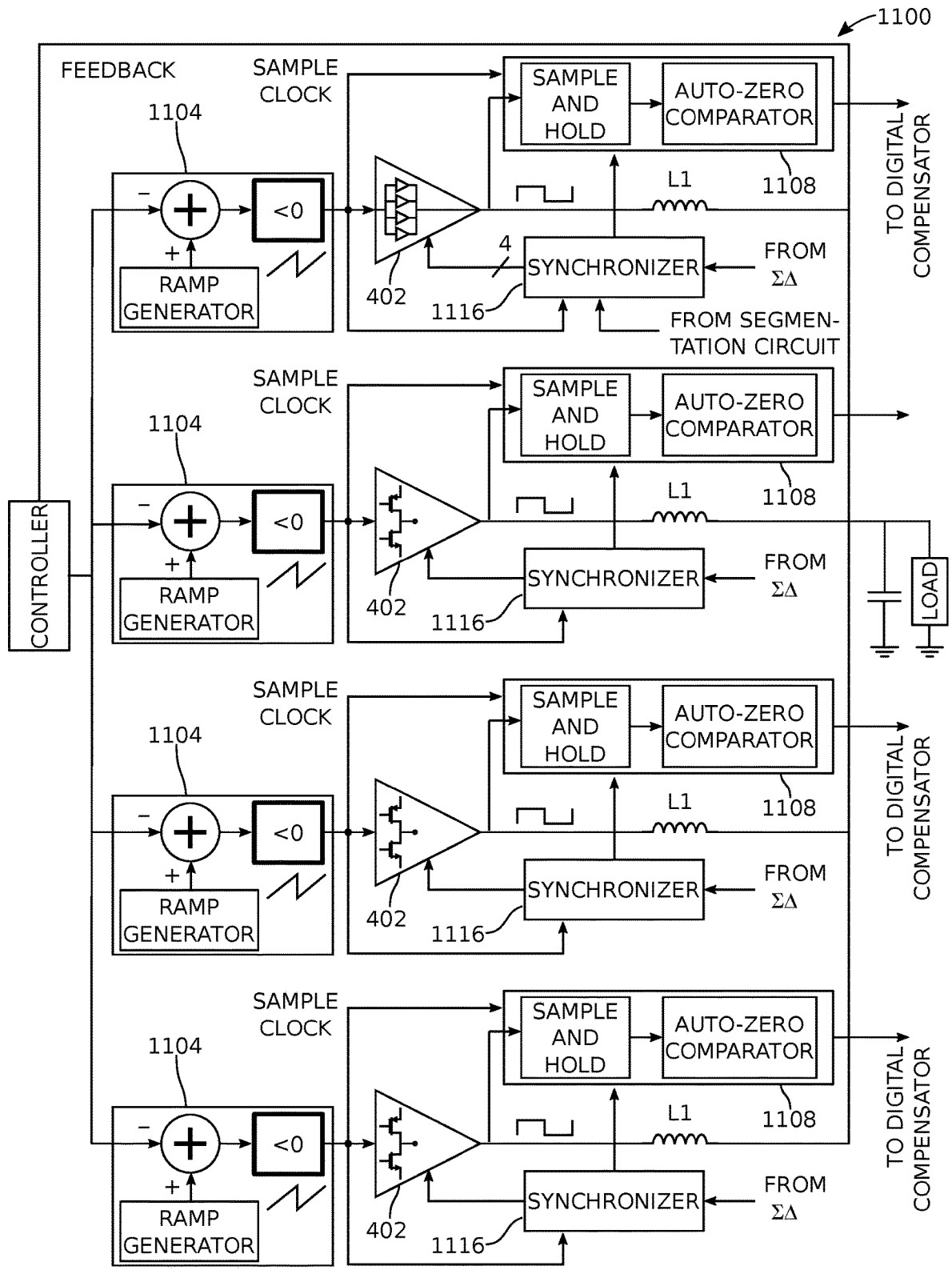
FIGS. 11A and 11B are a schematic block diagram depicting an exemplary 4-phase SMPS with adaptive synchronous drivers.
Figure 11B:
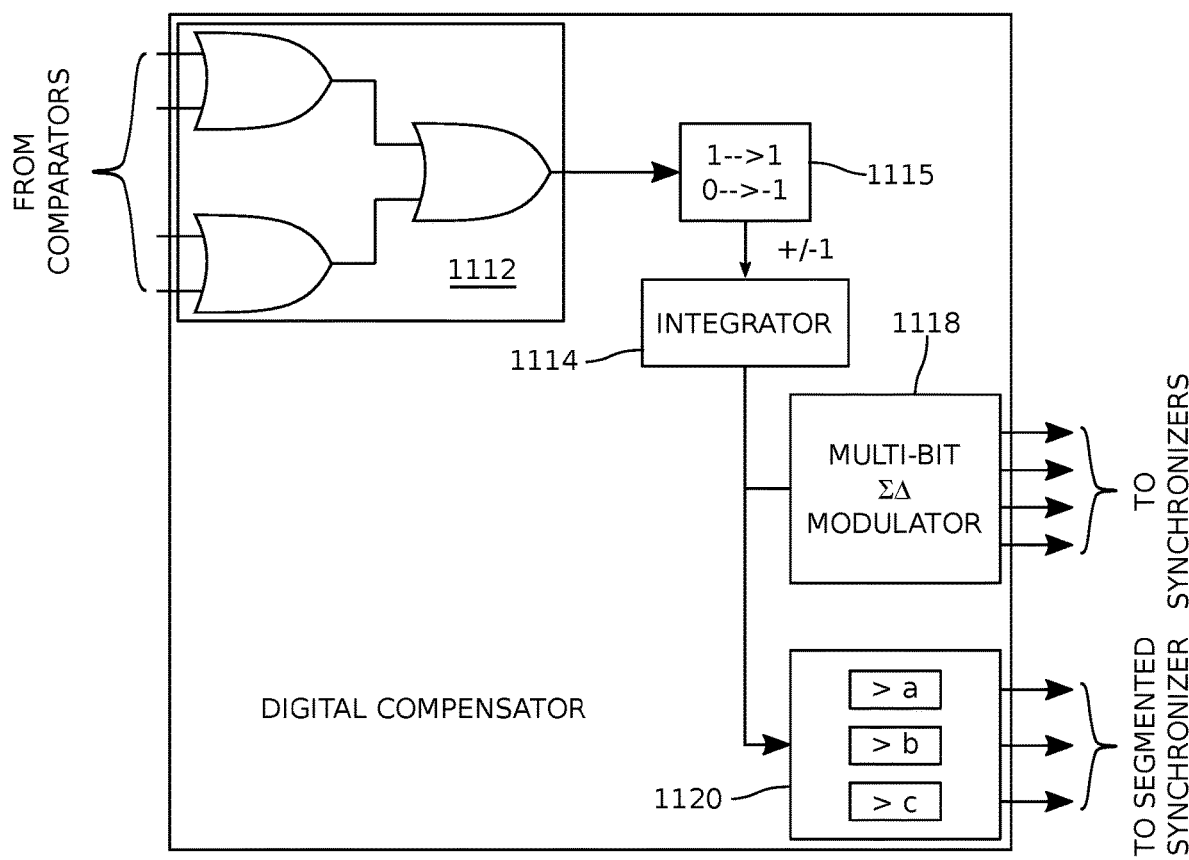

FIGS. 11A and 11B are a schematic block diagram depicting an exemplary 4-phase SMPS with adaptive synchronous drivers. The SMPS 1100 consists of 4 pulse drivers 1102, their respective ramp generators 1104 used for pulse-width modulation, and a single controller 1106 that adjusts the threshold for the pulse-width modulators. As shown previously, the current through the inductor is a triangular waveform, while the voltage into the inductor is a pulse. Of note is the output resistance of the NMOS and PMOS switches of the driver. Ideally, this resistance is zero for maximum efficiency, but practically, there is some small finite resistance which creates power losses as the current travels out of the devices and into the inductor. When the PMOS is turned off and the NMOS is turned on, the current has a negative slope. When the current has a positive slope, the voltage drop across the NMOS is negative as current flows from ground (i.e., the first reference voltage) to the output. If the current becomes zero, the voltage at the output becomes zero, and with precise timing, the comparators 1108 connected at the driver output sample the voltage at the valley of the current waveform and generate a one (i.e., first comparator signal) or zero (i.e., second comparator signal), depending on if the sampled voltage is positive or negative. The auto-zero circuit of the comparator is used to reduce offset errors in the comparator, although other simpler, but less accurate, comparison means may be used.

As shown in the digital compensator or coder 1110, the outputs from each of the comparators are OR'd together by circuit 1112 and this output is sent to an integrator 1114. In this aspect, digital amplifier 1115 converts 0 bits to a −1 value. If the driver attached to the comparator happens to be in a tri-state mode, a signal is sent to the comparator to mask its output, since in the tri-state mode the output of the comparator is invalid. The masking signals are supplied by the synchronizers 1116. If all of the comparators output a zero, a 1 is subtracted from the integrator. The output of the integrator is sent to a multi-bit sigma-delta modulator 1118, which creates the driver gating signals going to each of the output drivers. The loop drives the tri-state signals until all of the inductor currents remain above zero at which point the value at the output of the integrator becomes flat. The last driver to cycle on-off is segmented into multiple segments of NMOS and PMOS pairs, as shown in FIG. 5, and individual segments can be turned off to save on the power consumption of the SMPS. The number of segments that are de-activated depends on the amount of current being provided to the load and is derived by setting a comparison of the output of the integrator against a value representative of the current, as represented in segmentation circuit 1120. The less the load current, then more segments that are deactivated.

Figure 12:
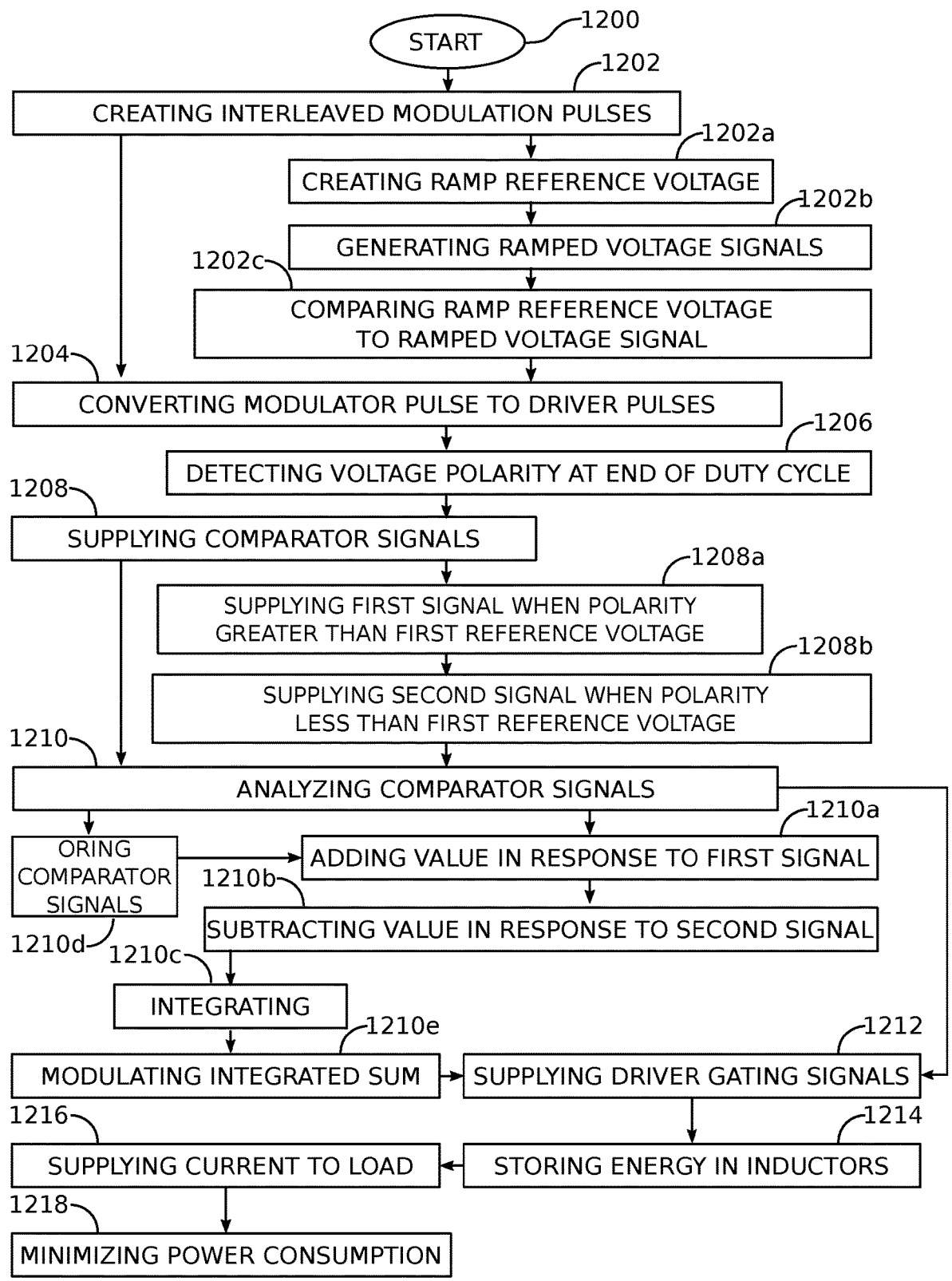
FIG. 12 is a flowchart illustrating a multi-phase SMPS method for adaptively controlling synchronous drivers.

FIG. 12 is a flowchart illustrating a multi-phase SMPS method for adaptively controlling synchronous drivers. Although the method is depicted as a sequence of numbered steps for clarity, the numbering does not necessarily dictate the order of the steps. It should be understood that some of these steps may be skipped, performed in parallel, repeated in a feedback loop, or performed without the requirement of maintaining a strict order of sequence. Generally however, the method follows the numeric order of the depicted steps. The method starts at Step 1200.

Step 1202 creates n periodic interleaved modulation pulses having a pulse width responsive to a load voltage, where n is a positive integer greater than 1. Step 1204 converts each modulation pulse into a selectively enabled driver pulse having a duty cycle responsive to the modulation pulse. Step 1206 detects the polarity of the voltage at the completion of each driver pulse duty cycle, where the driver pulse duty cycle comprises a high voltage portion and a low voltage portion, and the completion of the driver pulse duty cycle is associated with the low voltage portion. Step 1208 supplies a comparator signal in response to comparing detected voltages to a first reference voltage. Step 1210 analyzes the comparator signals. Step 1212 supplies driver gating signals to selectively enable driver pulses in response to analyzing comparator signals. Step 1214 stores energy from each driver pulse into a corresponding inductor, and Step 1216 supplies current from the inductors to a load, creating the load voltage. In response to disabling driver pulses when the integrated sum remaining a constant value, Step 1218 minimizes SMPS power consumption.

In one aspect, supplying the comparator signal in Step 1208 includes substeps. Step 1208a supplies a first comparator signal in response to the detected driver pulse voltage polarity being greater than the first reference voltage. Step 1208b supplies a second comparator signal in response to the detected driver voltage polarity being less than the first reference voltage. Then, analyzing the comparator signals in Step 1210 includes substeps. Step 1210a adds a first value to a sum in response to receiving any first comparator signal. Step 2110b subtracts the first value from the sum in response to receiving only second comparator signals in a PWM period. Step 1210c integrates the sum, and Step 1212 supplies driver gating signals enabling or disabling driver pulses in response to the integrated sum. Typically, detecting the polarity of the voltage at the completion of each driver pulse duty cycle (Step 1206) includes detecting a voltage polarity for each of the n driver pulses. Thus, supplying the comparator signals in Step 1208 includes supplying a comparator signal for each of the n driver pulses.

In one aspect, analyzing the comparator signals includes the following additional substeps. Step 1210d performs an operation ORing the n comparator signals to supply an OR'd result. Step 1210c integrates the OR'd result to supply the integrated sum. In Step 1210e the integrated sum is sigma-delta modulated to supply the driver pulse gating signals in Step 1212.

As noted above in the explanation of FIG. 4, converting modulation pulses into a selectively enabled driver pulses in Step 1204 includes using a plurality of parallel NMOS transistor and a PMOS transistor switches, with each switch connected between a supply voltage and the first reference voltage, with gates to accept the modulation pulses, and connected source/drains to supply driver pulses. As noted in the explanation of FIG. 5, Step 1204 may also enable the conversion of a modulation pulse into m parallel driver pulse segments having a summed output. Each driver pulse segment is selectively enabled in response to a corresponding segmentation signal. Then, analyzing the comparator signals in Step 1210 also includes supplying segmentation signals in response to analyzing the integrated sum.

In one aspect, creating n periodic interleaved modulation pulses in Step 1202 includes the following substeps. Step 1202a creates a ramp reference voltage in response to comparing the load voltage to a primary voltage reference. Step 1202b generates n periodic interleaved ramped voltage signals. Step 1202c compares the ramp reference voltage to each ramped voltage signal to supply n modulation pulses to a corresponding driver.

In another aspect, supplying driver gating signals to selectively enable driver pulses in Step 1212 may include synchronizing a modulation pulse with a corresponding driver pulse gating signal to disable a driver pulse.

In one example, supplying the comparator signal in Step 1208 includes supplying second comparator signals at a first time in response to detected voltages being less than the first reference voltage. Then, supplying driver gating signals in Step 1212 includes enabling n number of driver pulses at the first time, and supplying current from the inductors to the load in Step 1216 includes supplying a first current at the first time with a first efficiency. At a second time subsequent to the first time, Step 1208 supplies first comparator signals in response to detected voltages being greater than the first reference voltage. Then, Step 1212 enables (n−1) number of driver pulses, and Step 1216 supplies a second current at the second time, less than the first current, with the first efficiency.

A system and method have been provided for adaptively controlling the drivers in a multi-phase SMPS. Examples of particular circuits and hardware units have been presented to illustrate the invention. However, the invention is not limited to merely these examples. Other variations and embodiments of the invention will occur to those skilled in the art.

I claim:

1. A multi-phase switching mode power supply (SMPS) with adaptive synchronous drivers comprising:
   a pulse width modulator (PWM) having a feedback input to accept a load voltage and an output to supply n periodic interleaved modulation pulses having a pulse width responsive to the load voltage, where n is a positive integer greater than 1;
   n synchronous drivers, each driver having an input to accept a corresponding modulation pulse, an output to supply a driver pulse having a duty cycle responsive to the modulation pulse, and an input to accept a driver gating signal capable of enabling and disabling the driver;
   n comparators, each comparator having an input for detecting a polarity of a voltage at a completion of the driver pulse duty cycle, and supplying a comparator signal at an output responsive to the comparison of the detected voltage with a first reference voltage, where the driver pulse duty cycle comprises a high voltage portion and a low voltage portion, and the completion of the driver pulse duty cycle is associated with the low voltage portion;

a load having a first terminal to supply the load voltage and a second terminal connected to a second reference voltage;

n inductors, each inductor connected in series between a corresponding driver output and the load first terminal; and, a coder having an input to accept the n comparator signals and an output to supply driver gating signals in response to the comparator signals.

2. The multi-phase SMPS of claim 1 wherein each comparator supplies a first comparator signal in response to the detected driver pulse voltage polarity being greater than the first reference voltage and a second comparator signal in response to the detected driver voltage polarity being less than the first reference voltage; and, wherein the coder adds a first value to a sum in response to any comparator supplying the first comparator signal, and subtracts the first value from the sum in response to all the comparators supplying the second comparator signal in a PWM period, the coder integrating the sum and supplying the driver gating signals enabling and disabling drivers in response to the integrated sum.

3. The multi-phase SMPS of claim 2 wherein the coder comprises:

an OR gate having inputs to accept the n comparator signals and an output to supply an OR'd result;

an integrator having an input to accept values responsive to the OR's result and an output to supply the integrated sum; and, a sigma-delta modulator having an input to accept the integrated sum and an output to supply the driver gating signals.

4. The multi-phase SMPS of claim 2 wherein the nth driver comprises:

m parallel segmented switches having a summed output, each segmented switch having an input to accept the corresponding nth driver modulation pulse and an input to accept a tri-state signal, where m is an integer greater than 1;

wherein the coder further comprises:

a segmentation circuit having an input to accept the integrated sum, and an output to supply a segmentation signal for each of the segmented switches in the nth driver; and, wherein the segmented switch tri-state signals are responsive to corresponding segmentation signals from the coder.

5. The multi-phase SMPS of claim 2 wherein the each driver further comprises:

a synchronizer having an input to accept a corresponding modulation signal, an input to accept a corresponding driver gating signal disabling the driver, an output to supply a corresponding driver switch tri-state signal, and a masking signal output connected to the comparator, for selecting the second comparator signal.

6. The multi-phase SMPS of claim 1 wherein each driver comprises:

a plurality of parallel NMOS transistor and a PMOS transistor switches, each switch connected between a supply voltage and the first reference voltage.

7. The multi-phase SMPS of claim 1 wherein the PWM comprises:

a controller having an input to accept the load voltage, an input to accept a primary reference voltage, and an output to supply a ramp reference voltage in response to a comparison of the load and primary reference voltages;

n ramp generators, each supplying a periodic interleaved ramped voltage signal; and n modulation comparators, each modulation comparator having an input to accept the ramp reference voltage, an input to accept a corresponding ramped voltage signal, and an output to supply a modulation pulse to a corresponding driver.

8. The multi-phase SMPS of claim 1 wherein each comparator comprises:

a sample-and-hold circuit to capture the voltage polarity at the completion of the pulse driver duty cycle; and, an auto-zero circuit having an input to accept the sample-and-hold output, and an output to supply the comparator signal.

9. The multi-phase SMPS of claim 1 wherein the first reference voltage is equal to the second reference voltage.

10. A multi-phase switching mode power supply (SMPS) with adaptive synchronous drivers comprising:

a voltage control loop comprising:

a pulse width modulator (PWM) having a feedback input to accept a load voltage and an output to supply n periodic interleaved modulation pulses having a pulse width responsive to the load voltage, where n is a positive integer greater than 1;

n synchronous drivers, each driver having an input to accept a corresponding modulation pulse, an output to supply a driver pulse having a duty cycle responsive to the modulation pulse, and an input to accept a driver gating signal capable of enabling and disabling the driver;

a current control loop comprising:

n comparators, each comparator having an input for detecting a polarity of a voltage at a completion of the driver pulse duty cycle, and supplying a comparator signal at an output responsive to the comparison of the detected voltage with a first reference voltage, where the driver pulse duty cycle comprises a high voltage portion and a low voltage portion, and the completion of the driver pulse duty cycle is associated with the low voltage portion;

a coder having an input to accept the n comparator signals and an output to supply driver gating signals in response to the comparator signals;

a load having a first terminal to supply the load voltage and a second terminal connected to a second reference voltage; and, n inductors, each inductor connected in series between a corresponding driver output and the load first terminal.

11. A multi-phase switching mode power supply (SMPS) method for adaptively controlling synchronous drivers, the method comprising:

creating n periodic interleaved modulation pulses having a pulse width responsive to a load voltage, where n is a positive integer greater than 1;

converting each modulation pulse into a selectively enabled driver pulse having a duty cycle responsive to the modulation pulse;

detecting a polarity of a voltage at a completion of each driver pulse duty cycle, where the driver pulse duty cycle comprises a high voltage portion and a low voltage portion, and the completion of the driver pulse duty cycle is associated with the low voltage portion;

supplying a comparator signal in response to comparing detected voltages to a first reference voltage;

analyzing the comparator signals;

supplying driver gating signals to selectively enable driver pulses in response to analyzing the comparator signals;

storing energy from each driver pulse into a corresponding inductor; and, supplying current from the inductors to a load, creating the load voltage.

12. The method of claim 11 wherein supplying the comparator signal in response to comparing the detected voltage to the first reference voltage includes:

supplying a first comparator signal in response to the detected driver pulse voltage polarity being greater than the first reference voltage;

supplying a second comparator signal in response to the detected driver voltage polarity being less than the first reference voltage; and, wherein analyzing the comparator signals includes:

adding a first value to a sum in response to receiving any first comparator signal;

subtracting the first value from the sum in response to receiving only the second comparator signals in a PWM period;

integrating the sum; and, wherein supplying the driver gating signals includes enabling and disabling driver pulses in response to the integrated sum.

13. The method of claim 12 wherein converting the each modulation pulse into the selectively enabled driver pulse includes converting the nth modulation pulse into m parallel driver pulse segments having a summed output, where each driver pulse segment is selectively enabled in response to a segmentation signal; and, wherein analyzing the comparator signals further includes supplying segmentation signals in response to analyzing the integrated sum.

14. The method of claim 12 wherein detecting the polarity of the voltage at the completion of each driver pulse duty cycle includes detecting the voltage polarity for each of the n driver pulses; and, wherein supplying the comparator signal in response to comparing the detected voltage to the first reference voltage includes supplying the comparator signal for each of the n driver pulses.

15. The method of claim 14 wherein analyzing the comparator signals includes:

ORing the n comparator signals to supply an OR'd result;

integrating the OR'd result to supply the integrated sum; and, a sigma-delta modulating the integrated sum to supply the driver pulse gating signals.

16. The method of claim 14 further comprising:

in response to disabling the driver pulses when the integrated sum remains a constant value, minimizing SMPS power consumption.

17. The method of claim 11 wherein converting the each modulation pulse into the selectively enabled driver pulse includes using a plurality of parallel NMOS transistor and a PMOS transistor switches, with each switch connected between a supply voltage and the first reference voltage, having gates to accept the modulation pulses and connected source/drains to supply the driver pulses.

18. The method of claim 11 wherein creating n periodic interleaved modulation pulses having the pulse width responsive to the load voltage includes:

creating a ramp reference voltage in response to comparing the load voltage to a primary voltage reference;

generating n periodic interleaved ramped voltage signals; and comparing the ramp reference voltage to each ramped voltage signal to supply n modulation pulses to a corresponding driver.

19. The method of claim 11 wherein supplying the driver gating signals to selectively enable the driver pulses in response to analyzing the comparator signals includes synchronizing a modulation pulse with a corresponding driver pulse gating signal to disable a driver pulse.

20. The method of claim 11 wherein supplying the comparator signal in response to comparing the detected voltage to the first reference voltage includes supplying second comparator signals at a first time in response to detected voltages being less than the first reference voltage;

wherein supplying the driver gating pulses includes enabling n number of driver pulses at the first time;

wherein supplying current from the inductors to the load includes supplying a first current at the first time with a first efficiency;

wherein supplying the comparator signal in response to comparing the detected voltage to the first reference voltage includes supplying first comparator signals at a second time, subsequent to the first time, in response to detected voltages being greater than the first reference voltage;

wherein supplying the driver gating pulses includes enabling (n−1) number of driver pulses at the second time; and, wherein supplying the current from the inductors to the load includes supplying a second current at the second time, less than the first current, with the first efficiency.

* * * * *